(12) United States Patent
Schmidt et al.

(10) Patent No.: US 9,626,797 B2
(45) Date of Patent: Apr. 18, 2017

(54) GENERATING A CONSENSUS MESH FROM AN INPUT SET OF MESHES

(71) Applicant: AUTODESK, Inc., San Rafael, CA (US)

(72) Inventors: Ryan Michael Schmidt, Toronto (CA); Patricio Simari, Baltimore, MD (US)

(73) Assignee: AUTODESK, INC., San Rafael, CA (US)

( * ) Notice: Subject to any disclaimer, the term of this patent is extended or adjusted under 35 U.S.C. 154(b) by 518 days.

(21) Appl. No.: 14/043,353

(22) Filed: Oct. 1, 2013

(65) Prior Publication Data
US 2014/0098090 A1    Apr. 10, 2014

Related U.S. Application Data

(60) Provisional application No. 61/710,619, filed on Oct. 5, 2012.

(51) Int. Cl.
*G06T 17/20*    (2006.01)

(52) U.S. Cl.
CPC .................... *G06T 17/20* (2013.01)

(58) Field of Classification Search
None
See application file for complete search history.

(56) References Cited

U.S. PATENT DOCUMENTS

| | | | | |
|---|---|---|---|---|
| 6,453,275 B1 * | 9/2002 | Schoenmaker | ....... | G06F 17/175 703/2 |
| 6,686,921 B1 * | 2/2004 | Rushmeier | ............ | G06T 7/0073 345/423 |
| 2002/0042698 A1 * | 4/2002 | Meuris | ..................... | G06F 17/13 703/2 |
| 2006/0028466 A1 * | 2/2006 | Zhou | ..................... | G06T 17/205 345/420 |
| 2006/0050987 A1 * | 3/2006 | Shimada | .................. | G06T 17/20 382/285 |
| 2006/0164415 A1 * | 7/2006 | Smith | .................... | G06T 17/205 345/423 |
| 2007/0165025 A1 * | 7/2007 | Shen | ........................ | G06T 17/20 345/423 |
| 2012/0229464 A1 * | 9/2012 | Fishwick | ................. | G06T 17/20 345/423 |
| 2014/0028673 A1 * | 1/2014 | Gregson | .................. | G06T 17/20 345/420 |

* cited by examiner

*Primary Examiner* — James A Thompson
(74) *Attorney, Agent, or Firm* — Artegis Law Group, LLP

(57) ABSTRACT

Techniques are disclosed for generating a consensus mesh to cover a received set of points. In one embodiment, a meshing application generates multiple meshes that cover the received point set by varying parameters of an interpolating meshing technique, such as the ball-pivoting technique, tangent-space Delaunay triangulation, and the like. Different values for the one or more parameters are used to generate each of the meshes. After generating the multiple meshes, the meshing application may sort triangles in the meshes based on the frequency in which the triangles appear in the meshes. The meshing application may then iteratively add next-best triangles which are also compatible with the current consensus mesh to the consensus mesh, with the next-best triangle being a most frequently occurring triangle which has not yet been added to the consensus mesh. Compatibility may be defined using various criteria, such as producing a manifold and orientable triangulation.

20 Claims, 4 Drawing Sheets

GENERATING A CONSENSUS MESH FROM AN INPUT SET OF MESHES

CROSS-REFERENCE TO RELATED APPLICATION

This Application claims benefit of U.S. Provisional Patent Application Ser. No. 61/710,619 filed Oct. 5, 2012, which is incorporated herein by reference in its entirety.

BACKGROUND OF THE INVENTION

Field of the Invention

The present invention relates generally to computer science and, more specifically, to generating a consensus mesh from an input set of meshes.

Description of the Related Art

Meshing refers to techniques in computer graphics by which a three-dimensional (3D) surface may be covered by a "mesh" in much the same way upholstery covers a chair. While upholstery is made of fabric, a 3D mesh is created as a web of two-dimensional (2D) triangles. Triangles in a mesh may be filled with different colors, allowing a mesh to cover a 3D surface in a new color, much the same way a chair may be re-upholstered in a new fabric.

In many applications, a set of points, possibly with normals, needs to be covered with a triangle mesh that passes through the points. For example, an artist may wish to retile or repair a three-dimensional (3D) mesh while preserving important per-vertex attributes. As another example, the set of points may be a point cloud acquired using a 3D scanner, and the artist may desire maximum geometric fidelity in covering the point cloud with a mesh, but without artificial smoothing. In yet another example, the points may be sampled from a 3D surface and have important global properties, such a Poisson sampling, that should not be modified.

Various mesh generation techniques have been developed for covering sets of points with triangle meshes. However, these mesh generation techniques typically involve tuning parameters such as search radii or initial conditions such as seed triangles. As a result, a range of different meshes can be generated by varying the parameters and initial conditions. Depending on the parameters values chosen, such meshing techniques can leave unwanted flaws or holes in the mesh as an outcome of the meshing process.

SUMMARY OF THE INVENTION

One embodiment of the present invention sets forth a method for generating a consensus mesh to cover a set of points. The method generally includes generating a plurality of meshes that cover the set of points by varying one or more parameter values of an interpolating meshing technique. A different set of values for the one or more parameters may be used to generate each of the plurality of meshes. The method further includes sorting triangles in the plurality of meshes, in order of decreasing frequency in which the triangles appear in the plurality of meshes. In addition, the method includes iteratively adding triangles, in the sorted order, to the consensus mesh.

Further embodiments of the present invention include a computer-readable storage medium storing instructions that when executed by a computer system cause the computer system to perform the method set forth above, and a computer system programmed to carry out the method set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments disclosed herein generate consensus meshes which cover a received set of points. In one embodiment, a meshing application generates a series of meshes that cover the received point set by varying one or more parameters of an interpolating meshing technique. Examples of interpolating meshing techniques include a ball-pivoting technique, tangent-space Delaunay triangulation, etc., and more than one of these techniques may be used to generate the meshes. The parameters being varied may include, e.g., a spatial parameter (e.g., a radius in the ball-pivoting technique), a seed triangle from which the mesh is grown, and the like. Different values for the one or more parameters may be used to generate each of the meshes. After generating the meshes, the meshing application may sort triangles in the meshes based on the frequency in which the triangles appear in the meshes. The meshing application may then iteratively add next-best triangles which are compatible with the current consensus mesh to the consensus mesh. Essentially, each sample mesh "votes" for triangles, hence the name "consensus mesh." In one embodiment, the next-best triangle is a most frequently occurring triangle in the meshes which has not yet been added to the consensus mesh. Compatibility may be defined using various criteria, such as producing a manifold and orientable triangulation.

In one embodiment, the meshing application attempts to add a pair of triangles where a next-best triangle produces a non-manifold vertex. In such a case, the meshing application may search the potential set of triangles for a next-best compatible triangle which is connected to an edge of the next-best triangle. The meshing application may further compare an average frequency score for this pair of triangles to the frequency score of an overall next-best compatible triangle (which may not be connected to the next-best triangle), and add either the pair of triangles or the overall next-best compatible triangle to the mesh based on the comparison. In another embodiment, the meshing application may parallelize the consensus mesh computation by first splitting the received point set into subsets of points, generate consensus submeshes for each of the subsets, and stitch these submeshes together by generating stitching triangles using the same consensus meshing approach, with certain boundary triangles in the submeshes as constraints.

Hardware Overview

Figure 1:
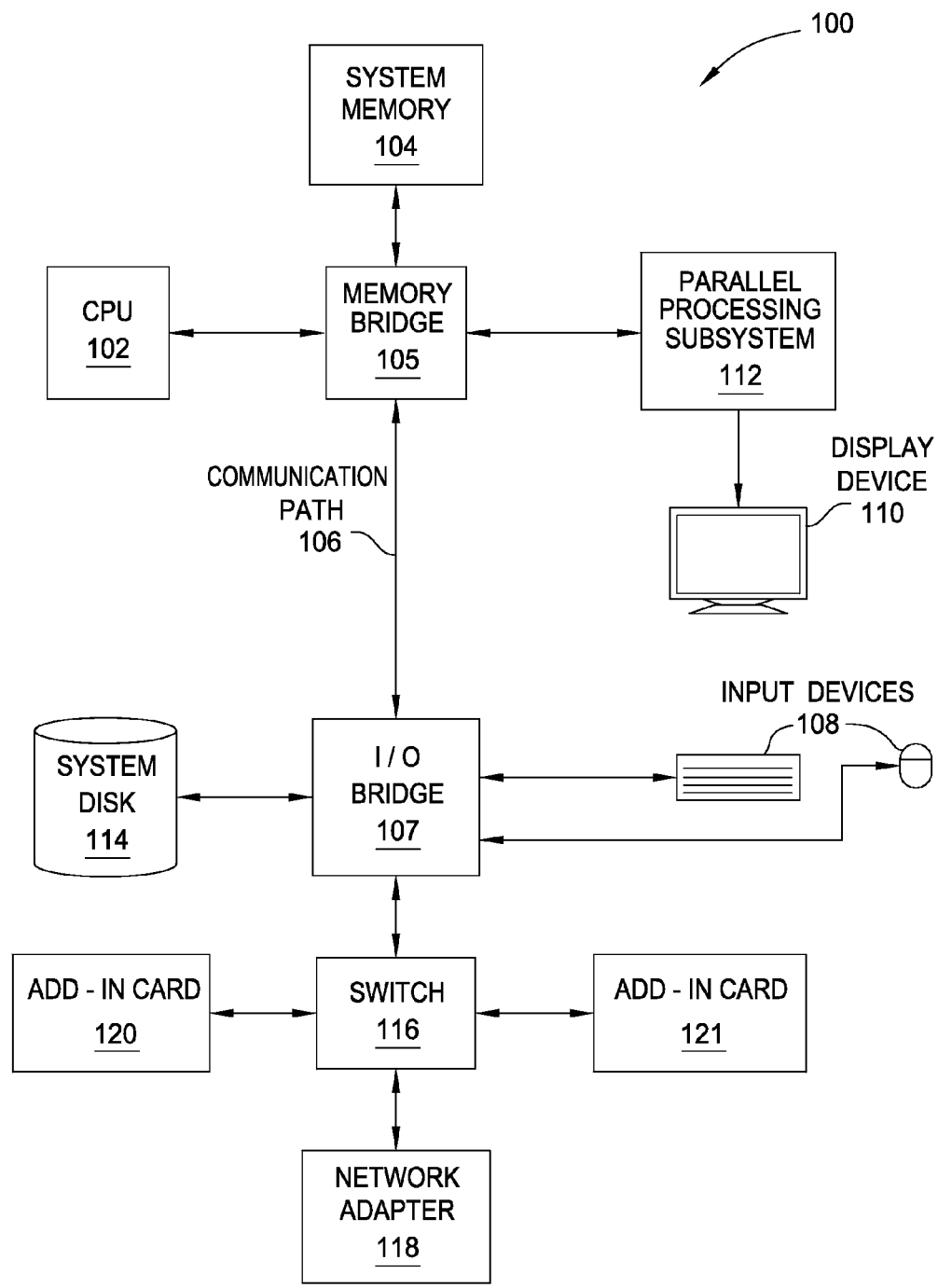
FIG. 1 illustrates a system configured to implement one or more aspects of the invention.

FIG. 1 depicts one architecture of a system 100 within which embodiments of the present invention may be implemented. This figure in no way limits or is intended to limit the scope of the present invention.

System 100 may be a personal computer, video game console, personal digital assistant, mobile phone, mobile device or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. In one embodiment, the software applications may include a meshing application (not shown) which is configured to generate consensus meshes according to methods 300-400, discussed in greater detail below. CPU 102 runs software applications and optionally an operating system. The meshing application may be run on the CPU 102 and/or on the display processor 112. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scan-line rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Consensus Meshing

As noted, embodiments disclosed herein generate consensus meshes which cover a received set of points. In one embodiment, a meshing application generates a series of meshes that cover the received point set by varying parameters of an interpolating meshing technique. Different values for the parameters may be used to generate each distinct mesh, and the parameter space may be sampled in any feasible manner (e.g., using a uniform step size, quadratically increasing step size, etc.). After generating the meshes, the meshing application may sort triangles in the meshes based on the frequency in which the triangles appear in the meshes. Higher frequency shows stability, as the same triangle appears in many of the meshes, indicating consistency and robustness. Stability, in turn, is used as a proxy for "good" triangles, as there is generally no objective measurement of good triangles. After sorting the triangles by frequency, the meshing application may iteratively add next-best triangles which are compatible with the current consensus mesh to the consensus mesh, with the next-best triangle being a most frequently occurring triangle which has not yet been added to the consensus mesh. Compatibility may be defined using various criteria, such as producing a manifold and orientable triangulation.

In one embodiment, the meshing application may attempt to add a pair of triangles where a next-best triangle would produce a non-manifold vertex. In such a case, the meshing application determine a next-best compatible triangle which is connected to an edge of the next-best triangle that would produce the non-manifold vertex. The meshing application may also compare an average frequency score for this pair of triangles to the frequency score of an overall next-best compatible triangle (which may not be connected to the next-best triangle). The meshing application may then add either the pair of triangles or the overall next-best compatible triangle to the mesh based on the comparison.

In another embodiment, the meshing application may parallelize the consensus mesh computation by splitting the received point set into subsets of points. The meshing application may generate consensus meshes for each of the subsets, and stitch these submeshes together by generating stitching triangles using the same consensus meshing approach, using certain boundary triangles in the submeshes as constraints.

Figure 2:
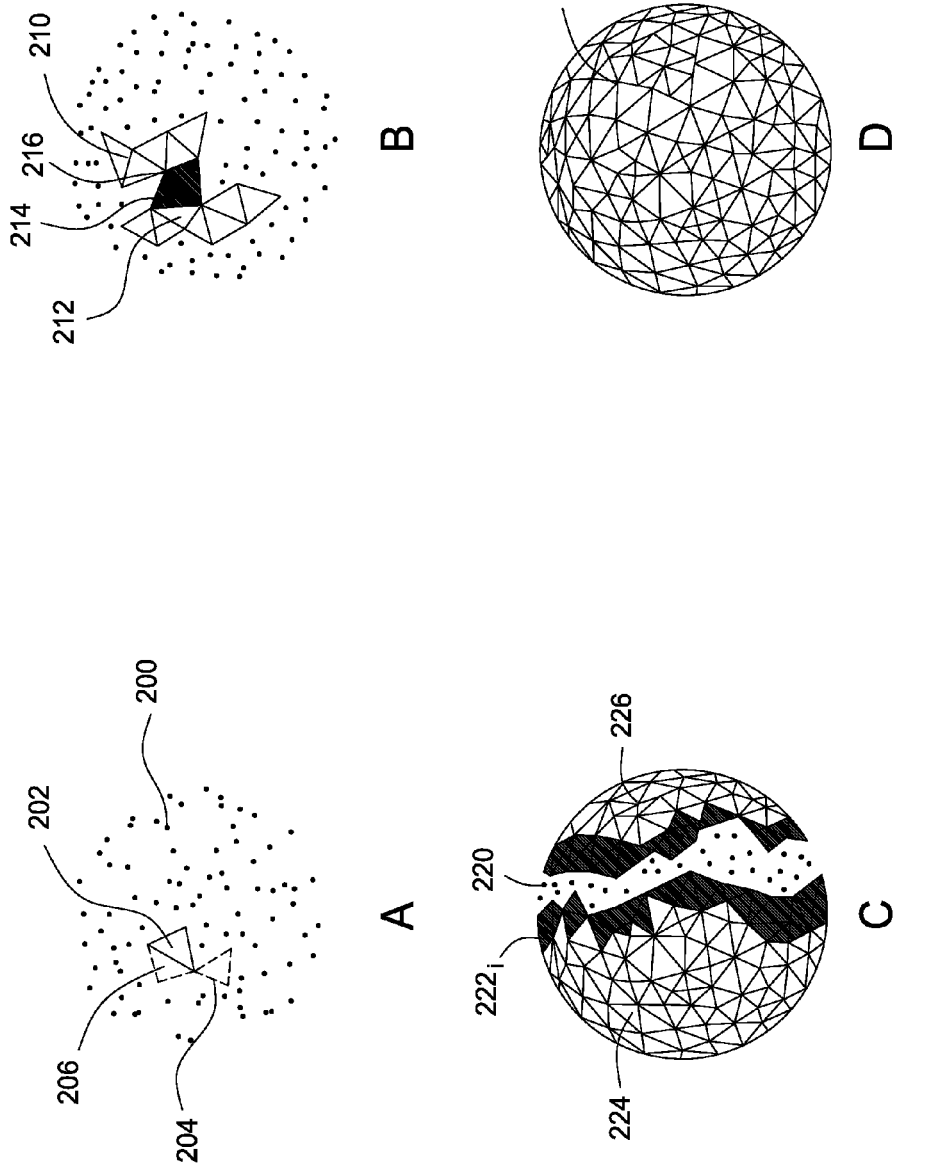
FIG. 2 illustrates an approach for generating a consensus mesh from a set of points, according to an embodiment.

FIG. 2 illustrates an approach for generating a consensus mesh from a set of points, according to an embodiment. Panel A shows a set of points 200 and a triangle 202. The set of points 200 may be, e.g., a point cloud acquired using a 3D scanner or points sampled from a 3D surface, among other things, and the triangle 202 is defined by a triplet of points in the set of points 200. In general, for a set of 3D point-samples $V=\{p_1, p_2, \ldots, p_n\}$, a triangle may be defined by a triplet of indices $t_{abc}=(a, b, c)$ or equivalently the triplet of points $t_{abc}=(p_a, p_b, p_c)$, assuming that no points are coincident up to floating-point error, i.e., for all i, j, $\|p_i - p_j\| > \delta$, where $\delta$ is some function of machine precision. Further, a mesh may be defined as a list of triangles $\mathcal{M} = \{t_1, t_2, \ldots, t_m\}$.

Although any set of triangles may be considered a mesh, many applications require a manifold mesh, possibly with boundary. A mesh is manifold if each vertex has a neighborhood isomorphic to a disc or half-disk, which implies that (1) each edge has one or two incident triangles, and (2) each vertex has a simply-connected neighborhood with either zero or two boundary edges. A mesh is orientable if a consistent clockwise or counter-clockwise orientation can be assigned to each triangle. In terms of triangle indices, orientability implies that across a shared edge (a, b), the two connected triangles must have ordered indices (a, b, c) and (b, a, d).

Now consider a process $P(\Theta)$ which generates a mesh based on input parameters $\Theta$, such as search radii. Examples of such processes for generating meshes include the ball-pivoting technique and tangent-space Delaunay triangulation, discussed in greater detail below. As $\Theta$ is varied, a series of meshes $\mathcal{M}_1, \mathcal{M}_2, \ldots, \mathcal{M}_N$ may be output by the process $P(\Theta)$. It may be assumed that there will be some "noise" in this process in the form of spurious or undesirable triangles (based on the subjective judgment of a model artist). Embodiments discussed herein attempt to reduce the presence of these spurious and undesirable triangles using the frequency that triangles appear in the meshes. As discussed, higher frequency shows stability, as the same triangle appears in many of the meshes, indicating consistency and robustness as opposed to randomness of the triangle. Stability, in turn, is used as a proxy for "good" triangles.

Let a statistic based on the presence or absence of a given triangle in meshes be defined as $$\delta(i, t_{abc}) = \begin{cases} 1 & \text{if } t_{abc} \in \mathcal{M}_i, \\ 0 & \text{otherwise.} \end{cases} \quad (1)$$

The meshing process may consider any orientation-preserving permutation of $t_{abc}$ to be equivalent, so $t_{abc} = t_{cab} = t_{bca}$. The frequency of a triangle $t_{abc}$ may then be defined as $$f(t_{abc}) = \frac{\sum_{i=1}^{N} \delta(i, t_{abc})}{K}, \quad (2)$$

where K is a normalizing constant. For example, K=N gives the probability that a triangle appears in a randomly selected mesh. In one embodiment, a relative ordering is used, and K is chosen as 1. In an alternative embodiment, the unit range $\bar{f}(t_{abc}) = f(t_{abc})/\max(f(t_{abc}))$ is used. Here, the function $\bar{f}(t_{abc})$ re-scales the values of $f(t_{abc})$ to be between 0 and 1 (i.e., the unit range).

Given the different meshes generated by the process $P(\Theta)$ as the parameter $\Theta$ is varied, there is a "triangle soup" over the fixed vertex set V comprising the triangles from the meshes. The problem is then to extract a manifold, orientable mesh which covers the set of input vertices V. To further constrain this extraction, it is desirable to maximize the sum of triangle frequency, i.e., to find $$\mathcal{M}_C = \arg\max \mathcal{M}_{\epsilon\Gamma} \Sigma_{t_{abc} \epsilon \mathcal{M}} f(t_{abc}), \quad (3)$$

where Γ is the space of manifold, orientable triangle meshes over V. $\mathcal{M}_C$ may be called a consensus mesh, as it maximizes the sum of "votes" for individual triangles under the constraint that the triangles agree on the mesh topology. Unfortunately, finding $\mathcal{M}_C$ is challenging, and is in fact NP-complete, because whether or not a given triangle can be included in $\mathcal{M}_C$ depends on the triangles in its local neighborhood, which in turn depend on their local neighborhood, and so on. This implies that a global combinatorial search would be necessary.

In one embodiment, the meshing application may instead employ a greedy, incremental extraction technique to generate a consensus mesh. In such a case, the meshing application may first sort the potential triangles in the "triangle soup" in order of decreasing (or increasing, as the case may be) frequency $f$ into a list $L_f$, and then iterate through the list and append any "compatible" triangles to $\mathcal{M}$, removing the appended triangles from the list $L_f$. In one embodiment, "compatible" triangles may include being manifold and consistently orientable, which rules out a variety of triangle configurations.

In panel A, triangle 202 and triangle 204, shown in dashed lines, would not be compatible under this definition, whereas triangles 202 and 206 would be compatible. In other embodiments, the definition of "compatible" triangles may be different depending on, e.g., whether being manifold and/or consistently orientable is important.

In one embodiment, the greedy incremental extraction technique may also incorporate constraints in the form of specific triangles which should exist in the consensus mesh. In one embodiment, the meshing application may simply remove constraint triangles from the list $L_f$ and append the triangles directly to the output consensus mesh. While it is not necessary that constraint triangles exist in the list $L_f$, it may be unlikely that such triangles are compatible with the rest of the mesh if the triangles are not in $L_f$.

As shown in panel B, the result of the greedy incremental extraction technique discussed above may be a set of small mesh "islands," such as islands 210 and 212, which are themselves consensus submeshes. This occurs because multiple isolated triangles are allowed to be added, but the constraint that all vertices remain manifold is also enforced. As a result, the meshing application is limited to adding isolated triangles or appending to existing boundary edges, producing the islands 210, 212. "Connector" triangles necessary to bridge the gaps between such islands may temporarily create non-manifold vertices, which are not allowed. To solve this problem, in one embodiment, the meshing application permits only a single isolated triangle to be added as a "seed" triangle and requires all further triangles to be connected to an existing edge. In such a case, the mesh may grow outwards from the seed triangle to cover the rest of the surface. However, only components connected to the seed triangle will be meshed according to this approach. Thus, this approach may leave cracks in the mesh when a compatible triangle on the boundary of the growing mesh is not in the set of potential triangles because, e.g., it was not generated in any sample mesh. In addition, the final result may be biased by the choice of seed.

In an alternative embodiment, the meshing application may attempt to add pairs of triangles (e.g., shaded triangles 214, 216) to cross gaps between isolated mesh islands. Many potential pairs of triangles may exist, requiring some selection criteria. For example, the greedy extraction technique discussed above may be augmented as follows. If the next-best triangle $t_k=(a, b, c)$ would result in a non-manifold vertex c, then the meshing application may search the potential set of triangles for the next-best compatible triangle $t_j$ that is connected to either edge (a, c) or the edge (b, c). Although the potential set may contain some triangle $t_j$, if the frequency score for $t_j$ is very low, then adding this triangle may result in many desirable triangles becoming incompatible. To avoid this, the meshing application may also find the next compatible triangle $t_{k+1}$ after triangle $t_k$, and compare triangle $t_k$ with the triangle pair $t_k$, $t_j$. In one embodiment, the comparison may check if $(f(t_k)+f(t_j))/2>f(t_{k+1})$. If such is the case, the meshing application adds the triangle pair $t_k$, $t_j$. Otherwise, the meshing application adds triangle $t_{k+1}$. To reduce the cost of this additional linear search, the meshing application may only consider potential $t_j$ whose score is within some threshold of $f(t_k)$, e.g., 0.9.

In yet another embodiment, the meshing application may employ a caching scheme to generate consensus meshes more efficiently. The greedy technique discussed above may be computationally expensive. To append a triangle, the meshing application must linearly search from the beginning of the current $L_f$. If a triangle which can potentially be paired is found, the meshing application must then linearly search from that triangle onwards to find a suitable pair triangle, and then perform a second search for the next-best non-pair triangle. As a result, a large number of triangles need to be test. Ideally, the search would always terminate near the beginning of $L_f$, and the meshing application would discard incompatible triangles from $L_f$ as they are encountered to ensure that they are only tested once. However, in most cases a large number of triangles will remain in the list which must be tested and then skipped, as they are not yet incompatible, but also cannot be connected to the expanding mesh. These compatibility tests involve interrogating the current mesh topology and have some cost. However, note that for most triangles in $L_f$, the addition of a single triangle $t_k$ will have no effect on the outcome of the compatibility tests. In one embodiment, the meshing application may take advantage of this coherence by storing timestamps for each point and each potential triangle, and consider adding a triangle to the consensus mesh only if a timestamp associated with the triangle is less than a maximum timestamp (i.e., newest time) of points which are vertices of the triangle. Timestamps for the points may be updated to the current time whenever a triangle is added which includes the point as a vertex. In generating the consensus mesh, the timestamp for a triangle may be updated to a new, maximum timestamp of that triangle's vertices when the meshing application tests the triangle. That is, while iterating through the list $L_f$, the meshing application may consider a triangle for insertion into the consensus mesh only if the timestamp for that triangle is less than the maximum timestamp of its vertices. If such is the case, the meshing application may test the triangle to determine whether to insert the triangle into the consensus mesh or discard the triangle if the triangle is not compatible with the current mesh. In some cases, the triangle cannot be inserted into the consensus mesh, but is not incompatible, as there is simply not enough geometry for the triangle to be connected to. For example, the insertion of the triangle may create a bowtie vertex. Such a triangle is not incompatible, but it requires more neighbors to be added first before the triangle itself can be added. In such a case, the triangle is neither inserted into the mesh nor discarded as incompatible, and the triangle may be placed back in the list of potential triangles, with its timestamp updated to the maximum (i.e., latest) timestamp of the vertices. The meshing application may again consider this triangle for insertion into the consensus mesh at a later time, but only if the timestamp for the triangle is less than the maximum timestamp of its vertices at that time, i.e., if the timestamps of its vertices are not updated. By comparing timestamps of triangles and their vertices, runtime for generating consensus meshes may be significantly reduced, as triangles are not re-tested if no mesh changes have been made that necessitate a re-test. In contrast to timestamping, another embodiment may incorporate spatial queries to restrict the search to triangles close to the advancing front of triangles being added to the mesh.

In one embodiment, the consensus meshing process may be parallelized to reduce runtime by reducing overall computational complexity. As shown in panel C, a received point set may be split into subsets of points, and consensus meshes 224, 226 generated for each point subset. Any feasible splitting of the points may be used. In one embodiment, a basic strategy may be used in which the received point set is split into a grid of axis-aligned cells, and the meshing application may compute consensus meshes for each grid cell, then incrementally append each grid cell mesh to the output mesh. To stitch the mesh for a given cell $c_i$ into the output mesh $\mathcal{M}$, the meshing application first finds cell faces shared with neighboring cells $c_j$ that are already appended to the output mesh. For each such neighboring cell, the meshing application may compute an overlap bounding-box $B_{ij}$ centered at the shared face, with width set to, e.g., 5-10% of the cell dimensions. All triangles of mesh $\mathcal{M}$ included in $\cup B_{ij}$ may then be discarded. Let $B'_{ij}$ be defined by expanding $B_{ij}$ by a factor of two outwards from the cell face, and define the point set V' as V'=$\{v \in V | v \in \cup B'_{ij}\}$. The meshing application may compute a consensus mesh (which may include one or more submeshes), with all triangles from mesh $\mathcal{M}$ that are in $\cup B'_{ij}$ as constraints by appending these triangles directly to the output, as discussed above. Illustratively, shaded triangles 222$_i$ may be used as constraint triangles when computing a consensus mesh for the region 220 between consensus meshes 224 and 226. The result of this process may be, e.g., a thin band of mesh surrounding cell $c_i$ comprised of two types of triangles: the constraint triangles which already exist in mesh $\mathcal{M}$, and the stitching triangles which do not. The stitching triangles may be appending to mesh $\mathcal{M}$ to fill in the stitching region.

Panel D shows an example of the final consensus mesh $\mathcal{M}$ after such stitching. Experience has shown that the consensus mesh may be of higher quality than the original meshes generated using the interpolating meshing technique. For example, holes may be filled in the consensus mesh, even if such holes existed in some of the original meshes.

Figure 3:
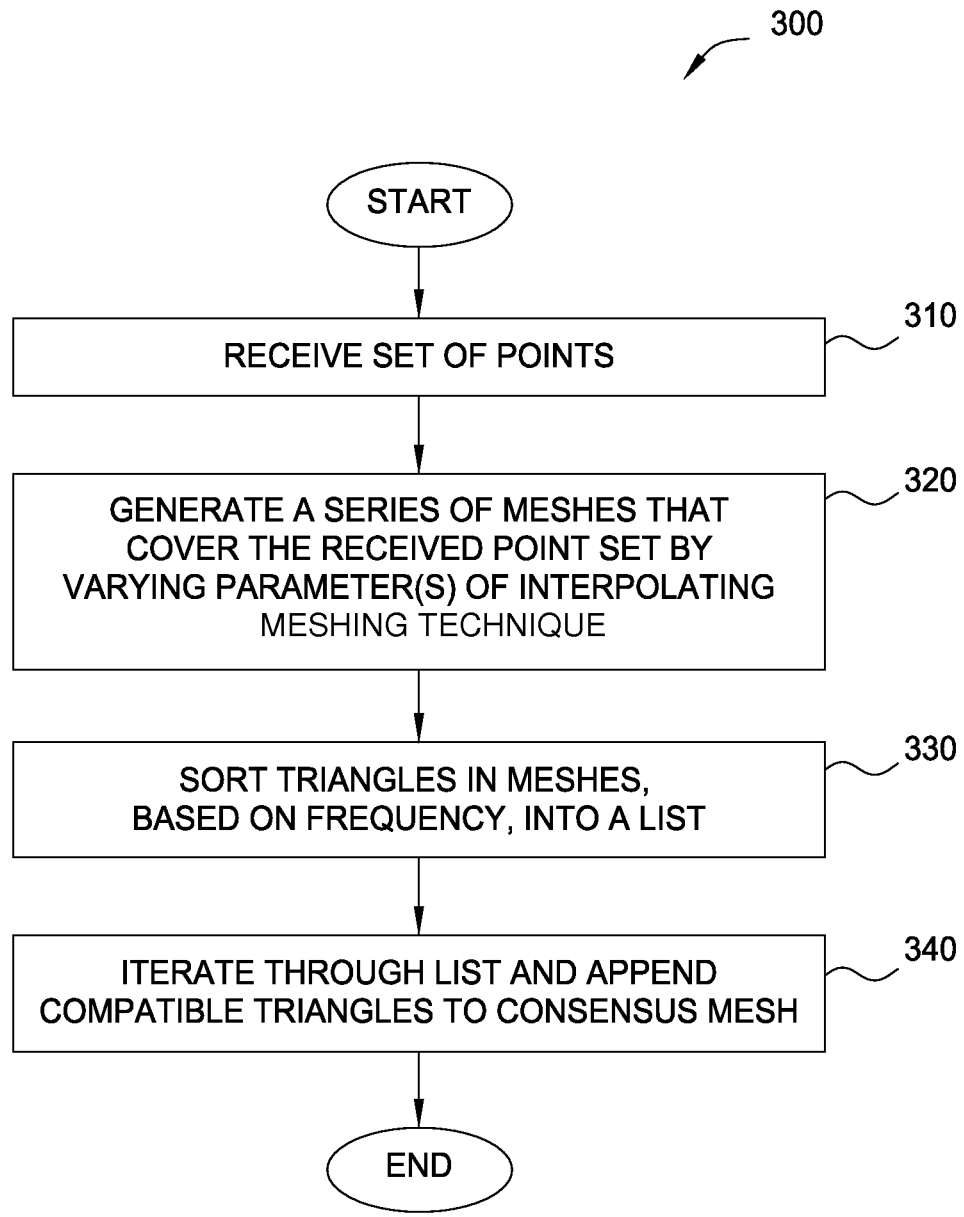
FIG. 3 illustrates a method for generating a consensus mesh based on triangle frequency, according to an embodiment.

FIG. 3 illustrates a method 300 for generating a consensus mesh based on triangle frequency, according to an embodiment. As shown, the method 300 begins at step 310, where a meshing application receives a set of points. The set of points may be obtained in any feasible manner. For example, the point set may be a point cloud acquired using a 3D scanner, points sampled from a 3D surface, etc.

At step 320, the meshing application generates a series of meshes that cover the received point set by varying parameters of an interpolating meshing technique. Examples of such interpolating meshing techniques include the ball-pivoting technique, tangent-space Delaunay triangulation, etc. In some embodiments, more than one such technique may be used to generate the series of meshes. As discussed, the parameters being varied may include, e.g., a spatial parameter (e.g., a radius), a seed triangle from which the mesh is grown, etc. For example, many interpolating meshing techniques include the spatial parameter that is used to define how far to search for points to connect as triangles. Further, the parameter space may be sampled in any feasible manner, such as uniform sampling, quadratically increasing sampling step sizes, etc.

The ball-pivoting technique is a well-known approach for reconstructing a triangle mesh given a set of points in which: first a seed triangle is selected, then for each edge of the seed a ball of radius r is pivoted around the edge until another point is hit. This generates a new triangle, and new edges, which may be processed in the same manner until no active edges remain. In ball-pivoting, the fixed ball radius r is a main limiting parameter. If the value of r is too large, the resulting mesh may differ significantly from the surface that generated the point set. If the value of r is too small, holes may be introduced in the mesh. This poses a problem for point sets where the spatial density of points varies, and, in generally, only a subset of the input points may be interpolated. In one embodiment, this problem is solved by sampling r, generating meshes using the ball-pivoting technique for each sampled value, and generating a consensus mesh from these meshes. Experience has shown that such a consensus mesh is of higher quality than input meshes generated directly by the ball-pivoting technique. Further, experience has shown that, by sampling smaller ball radii more densely, the consensus mesh may be improved over consensus meshes generated with a uniform sampling of the radii.

The tangent-space Delaunay triangulation technique may include, e.g., a Discrete Exponential Map (DEM) algorithm which projects points in a local neighborhood around a seed point p into the tangent space $T_p$. This tangent space is effectively a local planar parameterization, and may be put to various uses. A local Delaunay triangulation computed in a DEM tangent space may be considered a meshing process $P(\Theta)$ that does not cover the entire surface. The parameter $\Theta$ is then the seed point p, which may be varied to generate sample meshes and accumulate triangle statistics. Note, DEM is not a planar projection. It wraps around the surface with distortion proportional to the surface curvature and has zero distortion on developable surfaces, so meshes generated in the DEM tangent space are much closer to the principle of a Delaunay triangulation "in the manifold" than other techniques based on tangent-plane projection. In one embodiment, the seed point p may be varied by iterating through the input point set, ensuring that every point in the input point set is covered by some generated mesh in a form of stratified sampling. Alternatives such as randomly generating points and projection onto the surface via moving least squares may be used instead. Although DEM usually involves a geodesic radius, one embodiment may ensure reasonable coverage instead by simply running the DEM propagation until a fixed number of neighbors (e.g., 200) are parameterized. Experience has shown that consensus meshing using local Delaunay triangulation such as DEM may improve the quality of an existing tessellation. Other applications include computing a consensus mesh after a Poisson resampling is computed for an existing mesh.

At step 330, the meshing application sorts triangles in the meshes, in order of decreasing frequency, to create a list of triangles. That is, the meshing application determines the frequency of occurrence of each triangle in the meshes generated at step 320. The meshing application then sorts the triangles by frequency. As discussed, higher frequency indicates triangle stability, which is used as a proxy for "good" triangles. Experience has shown that other notions of triangle quality, such as that equilateral triangles are best, tend to produce lower quality meshes than sorting triangles by frequency. This may be because triangle frequency counts are not taken from a random triangle soup, but rather from meshes with largely consistent local neighborhoods, so triangles that occur more frequently are more likely to "fit" in a composite mesh. In addition, the underlying interpolating meshing technique is presumably already selecting high-quality triangles.

At step 340, the meshing application iterates through the list of triangles and appends next-best compatible triangles to a consensus mesh. As discussed, "compatible" may include being manifold and consistently orientable in one embodiment. Note that a potential triangle is incompatible with mesh $\mathcal{M}$ if: (1) any edge is connected to an interior edge of $\mathcal{M}$, (2) any vertex is connected to an interior vertex of $\mathcal{M}$, or (3) any edge is connected to an edge of $\mathcal{M}$ with opposite orientation. Such triangles may be discarded from the list $L_f$ whenever they are encountered. Potential triangles with vertices connected to existing boundary vertices are simply skipped during the current iteration. Each time a compatible next-best triangle is found, the meshing application may remove it from $L_f$ and then restart the search from the beginning of the updated potential set $L_f$.

As discussed, generating a consensus mesh by simply adding next-best compatible triangles may produce isolated mesh "islands." In one embodiment, the meshing application may attempt to add pairs of triangles (e.g., shaded triangles 214, 216) to cross gaps between such isolated islands. In such a case, the incremental technique of adding next-best compatible triangles may be augmented as follows. If the next-best triangle $t_k$=(a, b, c) would result in a non-manifold vertex c, then the meshing application may search the potential triangles in the list $L_f$ for the next-best compatible triangle $t_j$ that is connected to either edge (a, c) or the edge (b, c). Although some triangle $t_j$ may exist, if the frequency score for $t_j$ is very low, then adding this triangle may result in many desirable triangles becoming incompatible. To avoid this, the meshing application may also find the next compatible triangle $t_{k+1}$ after triangle $t_k$, and compare triangle $t_k$ with the triangle pair $t_k$, $t_j$ by checking if an average frequency score for this pair of triangles is greater than the frequency score of the triangle $t_k$, i.e., if $(f(t_k)+f(t_j))/2>f(t_{k+1})$. If such is the case, the meshing application adds the triangle pair $t_k$, $t_j$. Otherwise, the meshing application adds triangle $t_{k+1}$. The meshing application may also only consider potential $t_j$ whose score is within some threshold of $f(t_k)$.

In another embodiment, the meshing application may employ a caching scheme to generate consensus meshes more efficiently. In such a case, the meshing application may store timestamps for each point and each potential triangle, and consider adding a triangle to the consensus mesh only if a timestamp associated with the triangle is less than a maximum timestamp of points which are vertices of the triangle. As discussed, the meshing application may update the timestamps of a point to the current time whenever a triangle is added to the consensus mesh which includes the point as a vertex. In contrast, the meshing application may update the timestamp for a triangle to a maximum timestamp of its vertices whenever the triangle is tested and neither added to the consensus mesh or discarded as incompatible. Doing so reduces the runtime needed to generate consensus meshes, as redundant testing of triangles is avoided where the local neighborhood has not changed.

Figure 4:
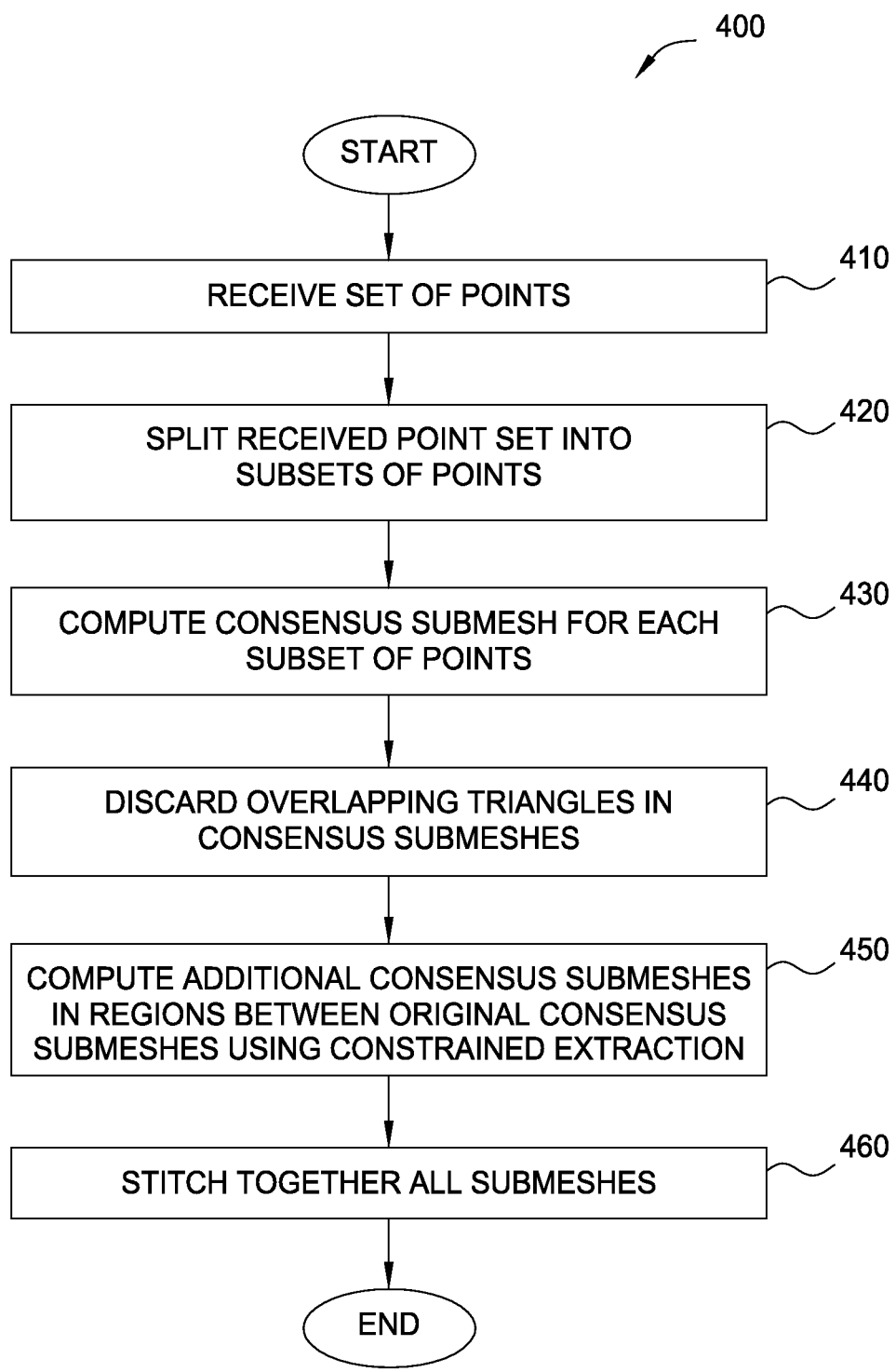
FIG. 4 illustrates a method for generating a consensus mesh using parallel processing, according to an embodiment.

FIG. 4 illustrates a method 400 for generating a consensus mesh using parallel processing, according to an embodiment. As shown, the method 400 begins at step 410, where a meshing application receives a set of points. At step 420, the meshing application splits the received point set into subsets of points. For example, the meshing application may split the received points into a grid of axis-aligned boxes.

At step 430, the meshing application computes a consensus submesh for each subset of points. Continuing the example of the grid of axis-aligned boxes, the meshing application may compute meshes for each grid cell. These computations may be performed in parallel, thereby reducing the overall computational complexity and improving runtime.

At step 440, the meshing application discards overlapping triangles in the consensus submeshes. As discussed, to stitch the mesh for a given cell $c_i$ into the output mesh $\mathcal{M}$, the meshing application may find cell faces shared with neighboring cells $c_j$ that are already appended to the output mesh. For each such neighboring cell, the meshing application may compute an overlap bounding-box $B_{ij}$ centered at the shared face, with width set to, e.g., 5-10% of the cell dimensions. Triangles of mesh $\mathcal{M}$ included in $\cup B_{ij}$ may then be discarded.

At step 450, the meshing application computes additional consensus submeshes in regions between original consensus submeshes using constrained extraction. As discussed, if $B'_{ij}$ is defined by expanding $B_{ij}$ by a factor of two outwards from the cell face, and the point set V' is defined as V'={v∈V|v∈∪$B'_{ij}$}, then the meshing application may compute a consensus mesh (which may include one or more submeshes), with all triangles from mesh $\mathcal{M}$ that are in $\cup B'_{ij}$ as constraints. The consensus submesh may be computed by performing steps similar to those of method 300. In one embodiment, the constraint triangles may be appended directly to the output.

At step 460, the meshing application stitches together all the submeshes to produce the final output mesh.

Although discussed above primarily with respect to generating a consensus mesh, additional techniques may be applied to further improve results by, e.g., filling holes, if any, in the consensus mesh. For example, a region around a hole may be discarded, and the constrained meshing computation, discussed above, applied to fill the region. Although discussed above with respect to triangle statistics and frequency with which triangles appear in sample meshes, an alternative embodiment may consider edge statistics instead, such as the frequency with which edges appear in the sample meshes.

Advantageously, techniques disclosed herein generate consensus meshes which cover sets of points. Each consensus mesh is generated based on frequency counts of triangles in meshes that are themselves generated by varying one or more parameters of an interpolating meshing technique. The consensus mesh automatically compensates for parameter-dependent deficiencies in the interpolating meshing techniques, so it is not necessary to manually explore a parameter range to find the "best" output. Experience has shown that the consensus mesh may improve in quality over the original meshes generated using the interpolating meshing technique. For example, holes may be eliminated in the consensus mesh. Constraints may be included in the generation of consensus meshes by simply adding desired triangles into the output mesh before adding other triangles based on frequency counts. Further, consensus meshes may be generated by computing consensus meshes for subsets of points in parallel, then stitching these meshes together. Doing so may improve runtime by reducing overall complexity.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating a consensus mesh to cover a set of points, comprising:
    generating a plurality of meshes that cover the set of points by varying one or more parameter values of an interpolating meshing technique, wherein a different set of values for the one or more parameters is used to generate each of the plurality of meshes;
    sorting triangles in the plurality of meshes, in order of decreasing frequency in which the triangles appear in the plurality of meshes; and
    iteratively adding triangles, in the sorted order, to the consensus mesh.

2. The method of claim 1, wherein the added triangles are also compatible triangles, determined based on whether a resulting triangulation is manifold and consistently orientable, the method further comprising:
    if, during the iterative adding of triangles, a first triangle would result in a non-manifold vertex:
        searching the set of triangles for a second compatible triangle which is connected to an edge of the first triangle,
        determining a third compatible triangle,
        comparing an average of frequencies of the first triangle and the second compatible triangle with a frequency of the third compatible triangle, and
        adding either the first triangle and the second compatible triangle or the third compatible triangle based on the comparison.

3. The method of claim 2, further comprising, storing timestamps for each point and each potential triangle, wherein a triangle is considered for addition to the consensus mesh during the iterative adding of triangles only if a timestamp associated with the triangle is less than a maximum timestamp of points which are vertices of the triangle.

4. The method of claim 1, further comprising:
    dividing the received set of points into a plurality of subsets of points, wherein the generating, sorting, and iteratively adding steps are performed in parallel for each of the subsets of points to produce a first set of consensus submeshes;
    discarding overlapping triangles in the consensus submeshes;
    generating a second set of consensus submeshes in regions between the first set of consensus submeshes; and
    stitching together the first and second sets of consensus submeshes.

5. The method of claim 4, wherein the second set of consensus submeshes is generated with boundary triangles of the first set of consensus submeshes as constraints.

6. The method of claim 1, wherein the interpolating meshing technique is a ball pivoting technique, and wherein a ball radius parameter is varied.

7. The method of claim 1, wherein the interpolating meshing technique is a tangent-space Delaunay triangulation technique, and wherein a seed point parameter is varied.

8. The method of claim 1, further comprising, before iteratively adding triangles, adding one or more triangles as constraints to the consensus mesh.

9. The method of claim 1, wherein, when the one or more parameters are varied, more sample values are taken for smaller spatial dimensions.

10. A non-transitory computer-readable storage medium storing instructions, which when executed by a computer system, perform operations for generating a consensus mesh to cover a set of points, the operations comprising:
    generating a plurality of meshes that cover the set of points by varying one or more parameter values of an interpolating meshing technique, wherein a different set of values for the one or more parameters is used to generate each of the plurality of meshes;
    sorting triangles in the plurality of meshes, in order of decreasing frequency in which the triangles appear in the plurality of meshes; and
    iteratively adding triangles, in the sorted order, to the consensus mesh.

11. The computer-readable storage medium of claim 10, wherein the added triangles are also compatible triangles, determined based on whether a resulting triangulation is manifold and consistently orientable, the operations further comprising:
    if, during the iterative adding of triangles, a first triangle would result in a non-manifold vertex:
        searching the set of triangles for a second compatible triangle which is connected to an edge of the first triangle,
        determining a third compatible triangle,
        comparing an average of frequencies of the first triangle and the second compatible triangle with a frequency of the third compatible triangle, and
        adding either the first triangle and the second compatible triangle or the third compatible triangle based on the comparison.

12. The computer-readable storage medium of claim 11, the operations further comprising, storing timestamps for each point and each potential triangle, wherein a triangle is considered for addition to the consensus mesh during the iterative adding of triangles only if a timestamp associated with the triangle is less than a maximum timestamp of points which are vertices of the triangle.

13. The computer-readable storage medium of claim 10, the operations further comprising:
    dividing the received set of points into a plurality of subsets of points, wherein the generating, sorting, and iteratively adding steps are performed in parallel for each of the subsets of points to produce a first set of consensus submeshes;
    discarding overlapping triangles in the consensus submeshes;

generating a second set of consensus submeshes in regions between the first set of consensus submeshes; and stitching together the first and second sets of consensus submeshes.

14. The computer-readable storage medium of claim 13, wherein the second set of consensus submeshes is generated with boundary triangles of the first set of consensus submeshes as constraints.

15. The computer-readable storage medium of claim 10, wherein the interpolating meshing technique is a ball pivoting technique, and wherein a ball radius parameter is varied.

16. The computer-readable storage medium of claim 10, wherein the interpolating meshing technique is a tangent-space Delaunay triangulation technique, and wherein a seed point parameter is varied.

17. The computer-readable storage medium of claim 10, the operations further comprising, before iteratively adding triangles, adding one or more triangles as constraints to the consensus mesh.

18. The computer-readable storage medium of claim 10, wherein, when the one or more parameters are varied, more sample values are taken for smaller spatial dimensions.

19. A system, comprising:
a processor; and
a memory, wherein the memory includes an application program that when executed by the processor, configure the processor to generate a consensus mesh to cover a set of points by:

generating a plurality of meshes that cover the set of points by varying one or more parameter values of an interpolating meshing technique, wherein a different set of values for the one or more parameters is used to generate each of the plurality of meshes, sorting triangles in the plurality of meshes, in order of decreasing frequency in which the triangles appear in the plurality of meshes, and iteratively adding triangles, in the sorted order, to the consensus mesh.

20. The system of claim 19, wherein the added triangles are also compatible triangles, determined based on whether a resulting triangulation is manifold and consistently orientable, the operations further comprising:

if, during the iterative adding of triangles, a first triangle would result in a non-manifold vertex:

searching the set of triangles for a second compatible triangle which is connected to an edge of the first triangle, determining a third compatible triangle, comparing an average of frequencies of the first triangle and the second compatible triangle with a frequency of the third compatible triangle, and adding either the first triangle and the second compatible triangle or the third compatible triangle based on the comparison.

* * * * *